(12) United States Patent
Nieten et al.

(10) Patent No.: US 10,934,419 B1
(45) Date of Patent: *Mar. 2, 2021

(54) AIR SPRINGS WITH IMPROVED HIGH TEMPERATURE PERFORMANCE

(71) Applicant: FIRESTONE INDUSTRIAL PRODUCTS COMPANY, LLC, Nashville, TN (US)

(72) Inventors: Jason Donald Nieten, Noblesville, IN (US); Michael Christopher Howard, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,601

(22) Filed: Dec. 3, 2019

Related U.S. Application Data

(63) Continuation of application No. 15/891,428, filed on Feb. 8, 2018, now Pat. No. 10,519,302, which is a continuation of application No. 14/750,062, filed on Jun. 25, 2015, now Pat. No. 9,914,821, which is a continuation of application No. 13/445,529, filed on Apr. 12, 2012, now Pat. No. 9,096,741.

(60) Provisional application No. 61/474,530, filed on Apr. 12, 2011.

(51) Int. Cl.
| | |
|---|---|
| *C08L 9/00* | (2006.01) |
| *C08K 3/04* | (2006.01) |
| *C08L 7/00* | (2006.01) |
| *C08L 11/00* | (2006.01) |
| *C08L 9/06* | (2006.01) |
| *C08L 23/16* | (2006.01) |

(52) U.S. Cl.
CPC .................. *C08L 9/00* (2013.01); *C08K 3/04* (2013.01); *C08L 7/00* (2013.01); *C08L 9/06* (2013.01); *C08L 11/00* (2013.01); *C08L 23/16* (2013.01); *C08L 2205/025* (2013.01)

(58) Field of Classification Search
CPC ...... C08L 9/00; C08L 7/00; C08L 9/06; C08L 11/00; C08L 23/18; C08K 3/04; F16F 9/0409; F16F 9/05; F16J 3/06; F16J 3/04
See application file for complete search history.

(56) References Cited

U.S. PATENT DOCUMENTS

| | | | |
|---|---|---|---|
| 3,319,952 A | 5/1967 | Travers et al. | |
| 9,556,921 B2 * | 1/2017 | Howard | B32B 1/08 |
| 10,519,302 B1 * | 12/2019 | Nieten et al. | C08L 7/00 |
| 2006/0131797 A1 | 6/2006 | Kerstetter | |
| 2006/0287434 A1 | 12/2006 | Wood et al. | |
| 2008/0111288 A1 | 5/2008 | Howard et al. | |
| 2010/0183856 A1 | 7/2010 | Kind | |
| 2011/0210486 A1 | 9/2011 | Agarwal et al. | |
| 2019/0331189 A1 * | 10/2019 | Howard | B60G 11/27 |

FOREIGN PATENT DOCUMENTS

| | | |
|---|---|---|
| GB | 1346202 | 2/1974 |
| WO | 2008051253 A1 | 5/2008 |
| WO | 2011088448 A1 | 7/2011 |

OTHER PUBLICATIONS

International Search Report for International Appl. No. PCT/US2011/021523 dated Jul. 21, 2011; 3 pages.

* cited by examiner

*Primary Examiner* — Nathan M Nutter
(74) *Attorney, Agent, or Firm* — Thomas R. Kingsbury; Arthur M. Reginelli

(57) ABSTRACT

An air spring bellow comprising a vulcanized rubber component including the at least partially vulcanized residue of EPDM and a rubber other than EPDM. A method for preparing an air spring bellow is also provided.

10 Claims, 4 Drawing Sheets

AIR SPRINGS WITH IMPROVED HIGH TEMPERATURE PERFORMANCE

This application is a continuation of U.S. application Ser. No. 15/891,428 filed on Feb. 8, 2018, which is a continuation of U.S. application Ser. No. 14/750,062 filed on Jun. 25, 2015 and is now issued as U.S. Pat. No. 9,914,821, which is a continuation of U.S. application Ser. No. 13/445,529 filed on Apr. 12, 2012 and is now issued as U.S. Pat. No. 9,096,741, which claims the benefit of U.S. Provisional Application Ser. No. 61/474,530 filed on Apr. 12, 2011, all of which are incorporated herein by reference.

FIELD OF THE INVENTION

Embodiments of the present invention are directed toward air springs, and more particularly the bellows of air springs, that have improved high temperature performance.

BACKGROUND OF THE INVENTION

Air springs, or pneumatic suspension devices, have long been used to isolate road disturbances from a vehicle, seat, or cab. An air spring, as part of a vehicle's suspension, supports the vehicle's load or mass at each axle. Typically, each axle of a vehicle associated with an air spring supports the mass component or load carried by the axle. In addition, there may be ancillary air springs that support driver comfort in and around the driver's compartment, or cab. In an air spring, a volume of gas, usually air, is confined within a flexible container. As an air spring is compressed (jounce travel), the pressure of the gas within the air spring increases; and as an air spring extends (rebound travel), the pressure of the gas within the air spring decreases. Road disturbances are mainly absorbed by this compression and extension of the air springs as a function of work ($w=\int F \cdot dx$). Air springs are often engineered to have a specific spring rate or spring constant, thereby controlling jounce and rebound characteristics for the desired application and for comfort.

Because an air spring may undergo countless cycles between compression and extension, the air spring must include an enclosure container for the gas that is flexible and durable. Typically, these enclosures are referred to as bellows or airsleeves and are made of cord-(fabric or metal) reinforced rubber compositions. Cord-fabric may be, but is not limited to, natural or synthetic materials.

As those skilled in the art appreciate, efforts to improve the emissions from trucks or other transportation vehicles that may be equipped with air springs has resulted in, among other things, higher operating temperatures for the engines of these vehicles. Unfortunately, however, these higher temperatures have placed higher demands on those air springs that are located near the engine or the exhaust from the engine. In particular, the operating temperature of the air springs has likewise increased, which has resulted in a reduced service life of the air spring, particularly the bellow. Likewise, vehicles equipped with air springs often operate in cold environments, which necessitate that the bellows have a useful low temperature operating window as well.

SUMMARY OF THE INVENTION

In one or more embodiments, the present invention provides an air spring bellow comprising a vulcanized rubber component including the at least partially vulcanized residue of EPDM and a complementary rubber.

In one or more embodiments, the present invention provides an air bellow prepared by a process comprising the steps of preparing a vulcanizable composition that includes EPDM, a complementary rubber, and a curative, fabricating the vulcanizable composition into an uncured air bellow, and at least partially curing the uncured air bellow.

DETAILED DESCRIPTION OF ILLUSTRATIVE EMBODIMENTS

Embodiments of the present invention are based upon the discovery that technologically useful air bellows can be manufactured from rubber compositions that include an elastomeric terpolymer, which may also be referred to as EPDM. In one or more embodiments, the air bellows are manufactured from rubber compositions that include a blend of EPDM and a complementary rubber. It has unexpectedly been discovered that blends of EPDM and a complementary rubber can provide air bellows with an overall advantageous balance of properties including improved high temperature performance, and in certain embodiments improved low temperature performance, service life at higher temperatures, and fabricability.

Air Spring Construction

Figure 1:
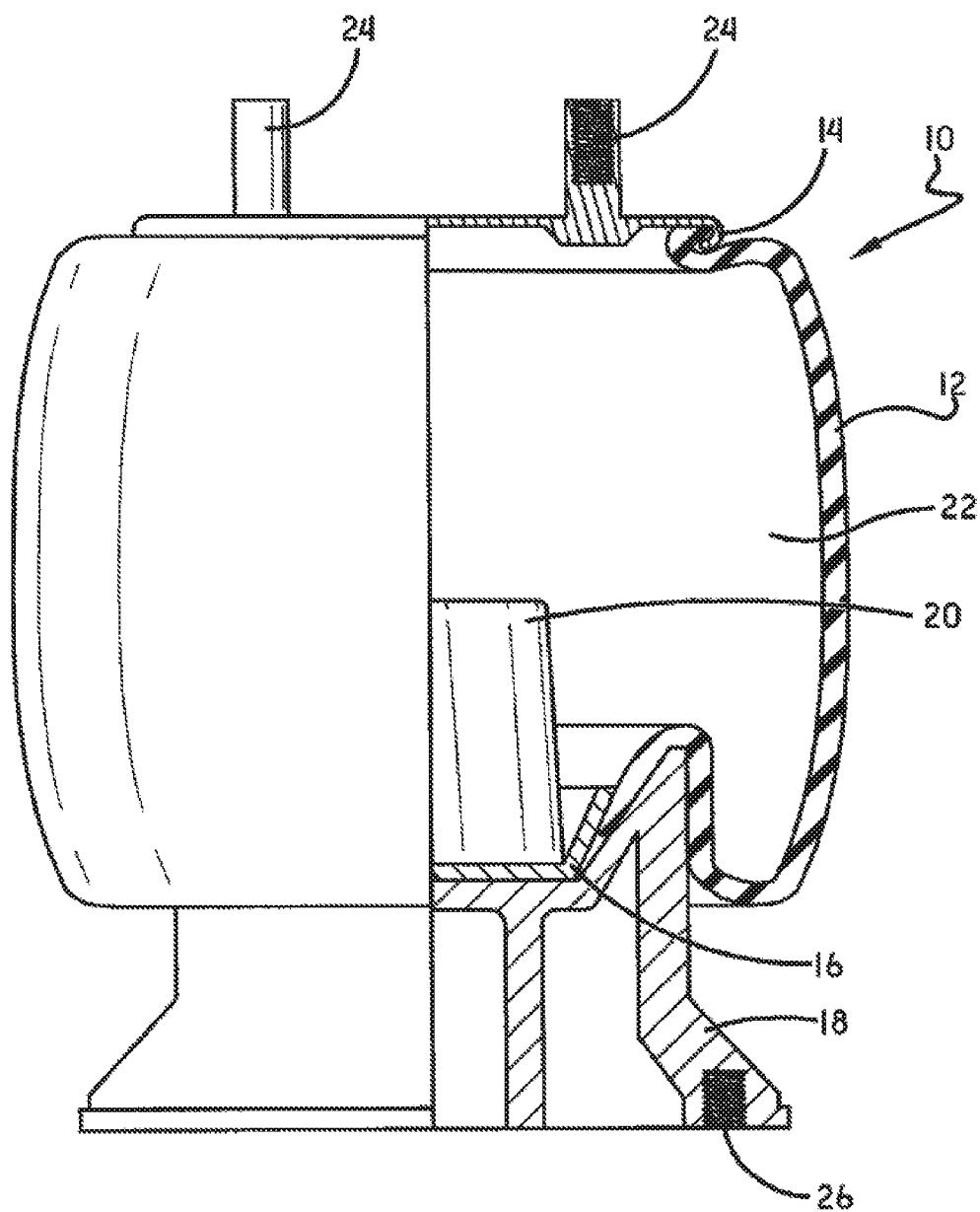
FIG. 1 is a perspective view of an exemplary air spring according to one or more embodiments of the present invention.

The figures show various embodiments of air springs. In FIG. 1, an air spring assembly is designated generally by the numeral 10. The air spring assembly 10 includes flexible airsleeve 12, which may also be referred as bellow 12. Bead plate 14 is crimped to airsleeve 12 to form an airtight seal between bead plate 14 and airsleeve 12. Similarly, end closure 16 is molded to flexible airsleeve 12 to form an airtight seal between end closure 16 and airsleeve 12. End closure 16 of airsleeve 12 is affixed to piston 18 by mechanical means well known in the art, including, for example, a piston bolt (not shown). Piston 18 provides a surface for flexible airsleeve 12 to roll on during compressive (jounce) travel. Flexible air spring assembly 10 may optionally include bumper 20 to support the vehicle when there is no air in the air springs or during extreme road disturbances. Enclosed within airsleeve 12 is a volume of gas 22. Studs 24 and hole 26 are used to secure the flexible air spring assembly 10 to the mounting surface of an automobile (not shown).

Figure 2:
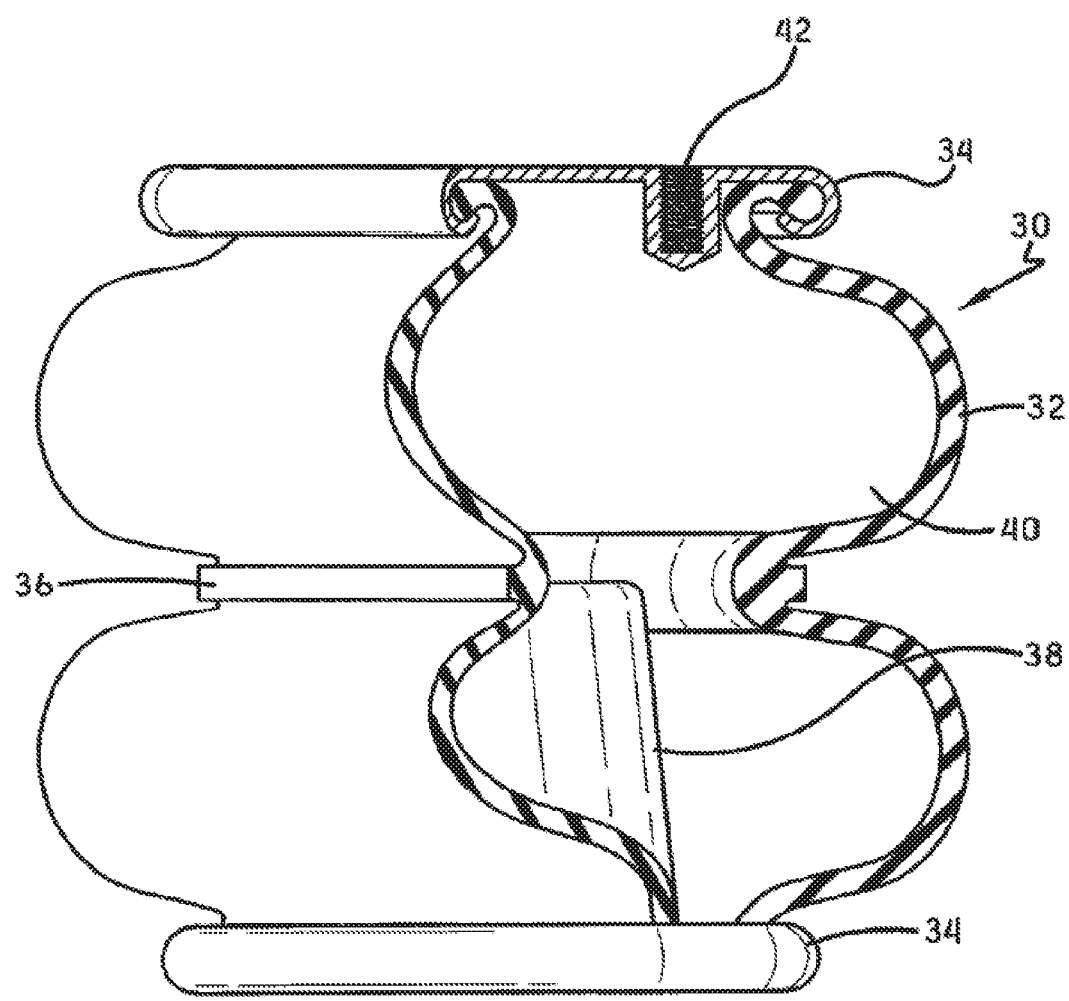
FIG. 2 is a perspective view of an exemplary air spring according to one or more embodiments of the present invention.

FIG. 2 shows an exemplary (double) convoluted air spring assembly designated generally by the numeral 30. Convoluted air spring assembly 30 includes flexible airsleeve 32. Bead plates 34 are crimped to airsleeve 32 to form an airtight seal between bead plates 34 and airsleeve 32. A girdle hoop 36 is affixed to airsleeve 32 between bead plates 34. Convoluted air spring assembly 30 may optionally include bumper 38 to support the vehicle when there is no air in the air springs or during extreme road disturbances. Enclosed within airsleeve 32 is a volume of gas 40. Blind nuts, including 42 and other blind nuts (not shown), are used to secure the convoluted air spring assembly 30 to the mounting surface of an automobile (not shown).

Figure 3:
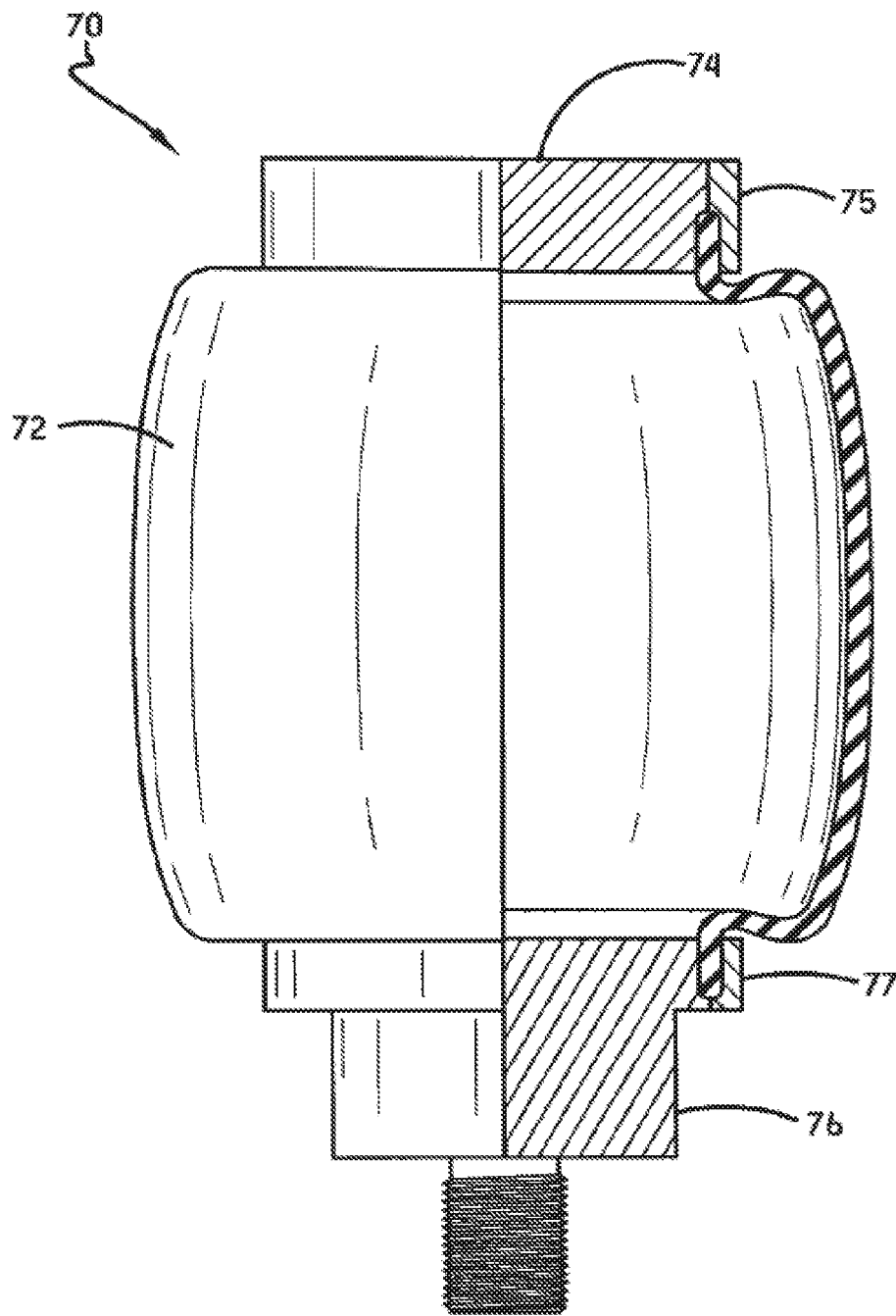
FIG. 3 is a perspective view of an exemplary air spring according to one or more embodiments of the present invention.

FIG. 3 shows an exemplary cab/seat spring assembly designated generally by the numeral 70. Cab/seat spring assembly 70 includes flexible air sleeve 72. Cab/seat plate 74 is attached to air sleeve 72 to form an air tight seal there between by using, for example, metal ring 75. An airtight seal can be made using known techniques such as those described in U.S. Pat. No. 6,474,630, which is incorporated herein by reference. Suspension plate 76 is likewise secured to airsleeve 72 via metal ring 77 to form an airtight seal there between.

Figure 4:
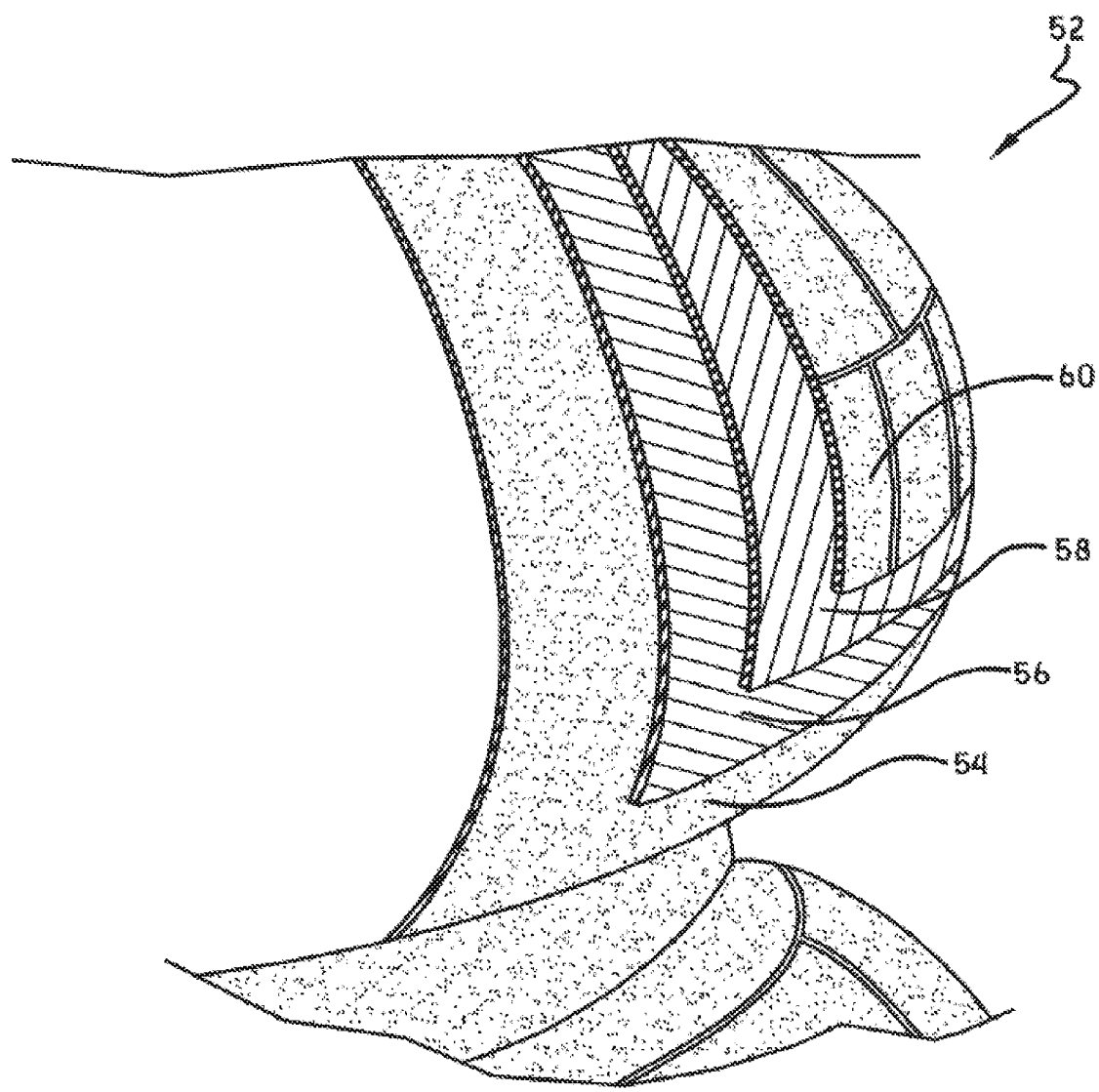
FIG. 4 is a cutaway view of an exemplary airsleeve showing its layered construction.

In one or more embodiments, airsleeves 12, 32, and 72 are made of cord-(fabric or metal) reinforced rubber and may be comprised of several layers, as shown in a cutaway view of an exemplary airsleeve 52 in FIG. 4. Exemplary airsleeve 52 features "two-ply" construction and includes four layers including: innerliner 54, first ply 56, second ply 58, and outer cover 60. Innerliner 54 and outer cover 60 may include calendared rubber. As shown, first ply 56 may include a single ply of cord-reinforced rubber with the cords at a specific bias angle, and second ply 58 may include a single ply of fabric-reinforced rubber with the same bias angle laid opposite that of first ply 56. In one or more embodiments, at least one layer of the bellows of the present invention IS fabricated according to practice of the present invention wherein the layer includes EPDM. In other embodiments, every layer of the bellow includes EPDM pursuant to one or more embodiments of the invention.

While the present invention is described in the context of an airsleeve and an air spring used in the suspension of an automobile, one of skill in the art will appreciate that the teachings disclosed are general and the present invention may be applied to other art relating to the air spring areas. The other areas might include, for example, air springs for seats, air springs used to support truck cabs, air springs used with buses, and the like.

Bellow Rubber Composition

In one or more embodiments, at least one layer of an airspring bellow (e.g., innerliner, first ply, second ply, and/or cover) are fabricated from a vulcanizable rubber composition that includes EPDM, an unsaturated rubber other than EPDM (i.e. complementary rubber), and a cure system. Other ingredients that may be included in the vulcanizable rubber formulation include plasticizers, antioxidants, fillers, oils, curatives, and other additives that are conventionally employed in rubber compositions.

In one or more embodiments, EPDM, which may also be referred to as an elastomeric terpolymer, includes mer units that derive from ethylene, α-olefin, and optionally diene monomer. Useful α-olefins include propylene. In one or more embodiments, the diene monomer may include dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene, and mixtures thereof. Olefinic terpolymers and methods for their manufacture are known as disclosed at U.S. Pat. No. 3,280,082, which is incorporated herein by reference. For purposes of this specification, elastomeric terpolymers may simply be referred to as EPDM.

In one or more embodiments, the elastomeric terpolymer may include at least 50 weight percent, in other embodiments at least 52 weight percent, in other embodiments at least 62 weight percent, and in other embodiments at least 64 weight percent mer units deriving from ethylene; in these or other embodiments, the elastomeric terpolymer may include less than 80 weight percent, in other embodiments less than 70 weight percent, in other embodiments less than 69 weight percent, mer units deriving from ethylene. In one or more embodiments, the elastomeric terpolymer may include at least 0.5 weight percent, in other embodiments at least 2 weight percent, in other embodiments at least 2.4 weight percent, mer units deriving from diene monomer; in these or other embodiments, the elastomeric terpolymer may include less than 20 weight percent, in other embodiments less than 10 weight percent, in other embodiments less than 8 weight percent, in other embodiments less than 7 weight percent, in other embodiments less than 6 weight percent, in other embodiments less than 5 weight percent, and in other embodiments less than 4 weight percent mer units deriving from diene monomer. In one or more embodiments, the balance of the mer units derive from propylene or other α-olefins.

In one or more embodiments, useful elastomeric terpolymers may be characterized by a neat Mooney Viscosity ($ML_{1+4}$@125° C.), which is the Mooney of the non-oil extended polymer, of at least 35, in other embodiments at least 40, or in other embodiments at least 45; in these or other embodiments, the neat Mooney is less than 70, in other embodiments less than 65, or in other embodiments less than 60.

Useful elastomeric terpolymers include amorphous terpolymers and semi-crystalline terpolymers. Amorphous polymers are those having from 0 to about 2 weight percent crystallinity; semi-crystalline polymers are those having from about 2 to about 13 weight percent crystallinity.

Useful elastomeric terpolymers are commercially available. Examples include Nordel® IP 4640 (available from DuPont Dow Elastomers, Wilmington, Del.), which has a Mooney Viscosity ($ML_{1+4}$@125° C.) of about 40, an ethylene to propylene ratio of 55/40, and about 5 weight percent of a third monomer (5-ethylidiene-2-norborene). Examples also include Keltan® 2326 (available from DSM Elastomers, Harleen, Netherlands), which has a Mooney Viscosity ($ML_{1+4}$@125° C.) of about 50, an ethylene to propylene ratio of 66/34, and about 2.5 weight percent of a third monomer (5-ethylidiene-2-norborene). Also suitable for the present invention is Royalene® 4611, which has a Mooney Viscosity ($ML_{1+4}$@125° C.) of about 65+/−5, an ethylene content of about 68 weight percent, and about 2.5 weight percent of a third monomer.

In one or more embodiments, the complementary rubber, which may also be referred to as a vulcanizable elastomer other than EPDM, includes those polymers that are capable of being cured or co-cured (also referred to as vulcanized) to form elastomeric compositions of matter.

In one more embodiments, the complementary rubber includes natural rubber and/or synthetic rubber. Exemplary types of synthetic rubber includes synthetic polyisoprene, polybutadiene, polyisobutylene-co-isoprene, polychloroprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, nitrile rubber, silicone rubber, epichlorohydrin rubber, and mixtures thereof. In particular embodiments, the complementary rubber is a blend of natural rubber and a polydiene such as polybutadiene.

In particular embodiments, the complementary rubber includes polymers that derive from the polymerization of halogenated dienes and optionally monomer copolymerizable therewith. A useful halogenated diene is 2-chloro-1,3-butadiene, which is also known as chloroprene. Monomer copolymerizable with chloroprene includes sulfur and 2,3-dichloro-1,3-butadiene. Homopolymers of chloroprene are generally referred to as polychloroprene. For purposes of this description, the rubbers deriving from the copolymerization of chloroprene and monomer copolymerizable therewith may be referred to as polychloroprene copolymers.

In one or more embodiments, polychloroprene or polychloroprene copolymers employed in the practice of this invention may be characterized by a Mooney viscosity ($ML_{1+4}$ at 100° C.) of at least 25, in other embodiments at least 40, in other embodiments at least 60, in other embodiments at least 80, and in other embodiments at least 100. In these or other embodiments, the polychloroprene or polychloroprene copolymers may be characterized by a Mooney viscosity ($ML_{1+4}$ at 100° C.) of less than 150, in other embodiments less than 130, in other embodiments less than 110 in other embodiments less than 80, in other embodiments less than 60, and in other embodiments less than 50. In particular embodiments, the polychloroprene or polychloroprene copolymers may be characterized by a Mooney viscosity ($ML_{1+4}$ at 100° C.) of from about 100 to about 120, and in other embodiments from about 41 to about 51.

In one or more embodiments, blends of distinct polychloroprene or polychloroprene copolymers may be employed to achieve a desirable balance of properties. These distinctions may be based upon comonomer content and/or viscosity of the polymers.

Particularly useful examples of desirable polychloroprene or polychloroprene copolymers are available from DuPont Performance Elastomers (Wilmington, Del.) under the Neoprene™ "WD" and "WRT" family designations. It is believed that Neoprene™ WD and WRT are relatively crystallization-resistant, versus Neoprene™ G-type, and are copolymers of chloroprene and 2,3-dichloro-1,3-butadiene. Neoprene™ WD exhibits a Mooney Viscosity range ($ML_{1+4}$ at 100° C.) of 100-120, while Neoprene™ WRT exhibits a Mooney Viscosity range ($ML_{1+4}$ at 100° C.) of 41-51.

In one or more embodiments, the vulcanizable composition may include an antioxidant. Useful antioxidants include bisphenol type antioxidants, diphenylamines, and zinc salts.

In one or more embodiments, the vulcanizable composition may include an antidegradant which may protect the final product vulcanizate against damaging external influences such as oxidation, ozone, heat, and dynamic stresses. Suitable antidegradants include 4- and 5-methyl-2-mercaptobenzimidazole (MMBI). Another suitable antidegradant is a mixed diaryl-p-phenylene type antidegradant. Another suitable antidegradant is IPPD, or N-isopropyl-N'-phenyl-p-phenylenediamine. Another suitable antidegradant is 6PPD, or N-(1,3-dimethylbutyl)-N-phenyl-p-phenylenediamine.

In one or more embodiments, the vulcanizable composition may include one or more fillers. Fillers may include organic and inorganic fillers. For example, the vulcanizable composition may include carbon black. In particular embodiments, the carbon black may include virtually pure elemental carbon in the form of colloidal particles that are produced by incomplete combustion or thermal decomposition of gaseous or liquid hydrocarbons under controlled conditions. In particular embodiments, a reinforcing carbon black is used; in other embodiments, non-reinforcing carbon black is used; and in other embodiments, a blend of reinforcing and non-reinforcing carbons are employed. Examples of reinforcing carbon blacks include N300 or N330 carbon black. In other embodiments, non-reinforcing carbon blacks include those conforming to the characteristics of ASTM N550 and ASTM N762.

In one or more embodiments, the filler may include silica. Useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed. Commercially available forms of silica are available from PPG Industries, Inc. (Monroeville, Pa.), Degussa Corporation (Parsippany, N.J.) and J.M. Huber Corporation (Atlanta, Ga.). One useful commercial product is Rubbersil® RS-150, which is characterized by a BET surface area of 150 $m^2/g$, tapped density of 230 g/liter, pH (5% in water suspension) of 7, $SiO_2$ content of 98%, $Na_2SO_4$ content of 2%, and $Al_2O_3$ content of 0.2%.

Other organic fillers include coal filler and ground recycled rubber. Other useful inorganic fillers include clays, talc, mica, titanium dioxide, and calcium carbonate. Useful clays include hydrated aluminum silicates.

In one or more embodiments, the vulcanizable composition may include low oil swell factices, vulcanized oils, and/or plasticizers. In specific embodiments, these compounds include sulfur vulcanized vegetable oils.

In one or more embodiments, useful plasticizers, which may also be referred to as softeners, include, but are not limited to, fatty acids, vegetable oils, petroleum products, coal tar products, pine products, esters, and resins. In particular embodiments, the plasticizers include esters such as dicapryilphthalate, butylcuminate, dibutylphthalate, butyllactate, glycerol chlorobenzoate, methylricinoleate, octyloleate, dioctylphthalate, or dioctylsebacate.

In one or more embodiments, the vulcanizable compositions may include a tackifier or tackifier resin. As is known in the art, these resins generally increase the tackiness of the composition. Natural or synthetic resins may be employed. In particular embodiments, a nitrile rubber latex is employed as a tackifier. In certain embodiments, the resin may include a resin of acetylene and p-t-butylphenol. Certain embodiments, selection of the tackifier and the amount of tackifier employed advantageously compensates for the lack of tackiness associate with the EPDM, which lack of tackiness would frustrate the processing of the vulcanizable composition and/or the manufacturing of the bellow.

In one or more embodiments, the vulcanizable composition may include wax. Wax is a processing aid and serves as a release agent. For example, the vulcanizable composition of this invention may include a low viscosity polyethylene wax. Low viscosity polyethylene wax is a release, or antisticking, agent.

As mentioned above, the vulcanizable composition includes a curative or cure package. The cure package may include a sulfur-based compound and may also include other optional ingredients such as cure accelerators or cure retarders. For example, the cure package may include sulfur in combination with a sulfur donor. Exemplary sulfur donors include TMTD (tetramethylthiuram disulfide) or DTDM or IPPD. Other ingredients that may assist or impact the cure include zinc oxide, as well as antioxidants such as Vulkanox MB2 (AO2). As is known in the art, where the vulcanizable rubber include halogenations, metal oxides, such as zinc oxide and magnesium oxide, may be used to crosslink the rubber.

Sulfurs that are soluble or insoluble in elastomers may be used. For example, polymeric sulfur is useful.

In one or more embodiments, the vulcanizable composition may include stearic acid. Stearic acid (octadecanoic acid) is a waxy solid and has the chemical formula $C_{18}H_{36}O_2$. Stearic acid is particularly effective as a processing aid in minimizing mill and calendar roll sticking.

In one or more embodiments, the vulcanizable composition may include magnesium oxide (MgO). Magnesium oxide may be used to neutralize trace hydrogen chloride that may be liberated by the polymer during processing, vulcanization heat aging or service. By removing the hydrogen chloride, magnesium oxide prevents auto-catalytic decomposition resulting in greater stability. Magnesium oxide may also take part in the crosslinking process.

In one or more embodiments, the cure system includes one or more cure retarders, which serve to slow the cure rate and ideally provide a marching cure profile. In particular embodiments, especially where the EPDM-containing vulcanizable compositions are employed to prepare the inner and outer layers of the multi-layered bellow, the cure rate of the inner and outer layers is slowed to match the cure rate of the core (i.e., cord-containing) layers. In one or more embodiments, the vulcanizable compositions of this invention are manipulated to achieve a $t_{90}$ of from about 5 to about 15 minutes, or in other embodiments from about 6 to about 13 minutes at 243° F. as determined by standard techniques using an oscillating die rheometer (ODR).

Ingredient Amounts

In general, the vulcanizable compositions include a sufficient amount of rubber to provide desirable properties to the bellow. In one or more embodiments, the vulcanizable compositions include at least 25, in other embodiments at least 35, and in other embodiments at least 45% rubber, based upon the total weight of the vulcanizable composition. In these or other embodiments, the vulcanizable compositions may include less than 60% by weight, in other embodiments less than 50% by weight, and in other embodiments less than 40% by weight rubber, based upon the total weight of the vulcanizable composition. In these or other embodiments, the vulcanizable compositions may include from about 20 to about 70 weight %, in other embodiments from about 30 to about 60 weight %, and in other embodiments from about 35 to about 55 weight %, based on the total weight of the composition.

In one or more embodiments, the vulcanizable compositions may include at least 15 weight %, in other embodiments at least 25 weight %, in other embodiments at least 35 weight %, in other embodiments at least 45 weight %, in other embodiments at least 50 weight %, in other embodiments at least 55 weight %, in other embodiments at least 65 weight %, in other embodiments at least 70 weight %, and in other embodiments at least 75 weight % EPDM, based upon the total weight of the rubber in the vulcanizable composition. In these or other embodiments, the vulcanizable compositions may include less than 90 weight %, in other embodiments less than 85 weight %, in other embodiments less than 80 weight %, in other embodiments less than 75 weight %, in other embodiments less than 70 weight %, in other embodiments less than 65 weight %, and in other embodiments less than 60 weight % EPDM, based upon the total weight of the rubber in the vulcanizable composition. In these or other embodiments, the vulcanizable compositions include from about 40 to about 80 weight %, in other embodiments from about 50 to about 70 weight %, and in other embodiments from about 55 to about 65 weight % EPDM, based on the total weight of the rubber in the vulcanizable composition.

In one or more embodiments, the balance of the rubber component of the compositions of this invention includes one or more complementary rubbers (i.e. vulcanizable rubber other than EPDM). In other words, the compositions of the present invention include at least 10 weight %, in other embodiments at least 15 weight %, in other embodiments at least 20 weight %, in other embodiments at least 25 weight %, in other embodiments at least 30 weight %, in other embodiments at least 35 weight %, in other embodiments at least 40 weight % vulcanizable rubber other than EPDM, based upon the total weight of the rubber in the vulcanizable composition. In these or other embodiments, the vulcanizable compositions may include less than 60 weight %, in other embodiments less than 55 weight %, in other embodiments less than 50 weight %, in other embodiments less than 45 weight %, in other embodiments less than 40 weight %, in other embodiments less than 35 weight %, in other embodiments less than 30, in other embodiments less than 25 weight %, and in other embodiments less than 20 weight % vulcanizable rubber other than EPDM, based upon the total weight of the rubber in the vulcanizable composition. In these or other embodiments, the vulcanizable compositions include from about 10 to about 60 weight %, in other embodiments from about 20 to about 50 weight %, and in other embodiments from about 30 to about 45 weight % unsaturated rubber other than EPDM, based upon the total weight of the rubber in the vulcanizable composition.

In particular embodiments, the complementary rubber includes a blend of natural rubber and a polydiene rubber (e.g., polybutadiene), and the weight ratio of the natural rubber to the polydiene may be from 0.3:1 to 2:1, in other embodiments from 0.5:1 to 1.5:1, and in other embodiments from 0.7:1 to 1.3:1.

In one or more embodiments, the weight ratio of EPDM to complementary rubber (i.e., unsaturated rubber other than EPDM) may be from about 10:1 to about 1:1, in other embodiments from about 8:1 to about 2:1, and in other embodiments from about 5:1 to about 3:1.

In one or more embodiments, the complementary rubber includes polychloroprene or polychloroprene copolymers. In other embodiments, the amount of polychloroprene or polychloroprene copolymers may be reduced or limited. In these or other embodiments, the amount of polychloroprene copolymers that is used in other air spring compositions may be reduced by an amount substantially equivalent to the amount of EPDM that is present. In other words, polychloroprene copolymers are replaced in the air spring composition by EPDM. In particular embodiments, the vulcanizable compositions are devoid of polychloroprene.

In one or more embodiments, the vulcanizable compositions may include at least 7 parts by weight (pbw), in other embodiments at least 10 pbw, and in other embodiments at least 12 pbw plasticizer, based on 100 parts by weight rubber (phr). In these or other embodiments, the vulcanizable compositions may include less than 25 pbw, in other embodiments less than 20 pbw, and in other embodiments less than 18 pbw plasticizer phr. In these or other embodiments, the vulcanizable compositions include from about 7 to about 22 weight %, in other embodiments from about 10 to about 20 pbw, and in other embodiments from about 12 to about 17 pbw plasticizer, based on 100 parts by weight rubber (phr).

In one or more embodiments, the vulcanizable composition may include at least about 20, in other embodiments at least about 30, and in other embodiments at least about 40 pbw carbon black phr. In one or more embodiments, the vulcanizable composition may include less than about 100, in other embodiments less than about 75, and in other embodiments less than about 50 pbw carbon black phr.

In one or more embodiments, the vulcanizable composition may include at least 15, in other embodiments at least 20, and in other embodiments at least 25 pbw silica phr. In one or more embodiments the vulcanizable composition may include less than 250, in other embodiments less than 200, in other embodiments less than 90, and in other embodiments less than 80 pbw silica phr. Where both carbon black and silica are employed, the weight ratio of carbon black to silica may range from 9:1 to 0.5:1, in other embodiments from 5:1 to 1:1, and in other embodiments from 4:1 to 2:1.

In certain embodiments, the vulcanizable composition of this invention is devoid of factice. In one or more embodiments, the vulcanizable composition may include at least about 1, in other embodiments at least about 2, and in other embodiments at least about 3 pbw factice phr. In one or more embodiments, the vulcanizable composition may include less than about 10, in other embodiments less than about 8, and in other embodiments less than about 6 pbw factice phr.

In certain embodiments, the vulcanizable composition of this invention may include at least 0.1 part by weight, in other embodiments at least 0.2 parts by weight, in other embodiments at least 0.4 parts by weight, in other embodiments at least 0.5 parts by weight, in other embodiments at least 0.6 parts by weight, in other embodiments at least 0.7 parts by weight, in other embodiments at least 0.8 parts by weight, in other embodiments at least 0.9 parts by weight, and in other embodiments at least 1.0 parts by weight tackifier resin phr. In these or other embodiments, the compositions of this invention may include less than 10 parts by weight, in other embodiments less than 8 parts by weight, in other embodiments less than 6 parts by weight, in other embodiments less and 4 parts by weight, and in other embodiments less than 2 parts by weight tackifier per 100 parts by weight rubber.

In these or other embodiments, the vulcanizable composition may include less than 20 pbw, in other embodiments less than 18 pbw, in other embodiments less than 16 pbw, in other embodiments less than 14 pbw, and in other embodiments less than 12 pbw tackifier phr.

Those skilled in the art will be able to select an appropriate amount of the various ingredients that can be used based upon the ultimate desired properties sought within the airsleeve of an air spring. Likewise, those skilled in the art will be able to select an appropriate amount of curative and complementary cure agents in order to achieve a desired level of cure.

Preparation of Bellow

The compositions for preparing one or more layers of airsleeve according to the present invention can be prepared by conventional means using conventional rubber compounding equipment such as Brabender, Banbury, Werner-Pfleiderer, Sigma-blade mixer, two-roll mill, or other mixers suitable for forming viscous, relatively uniform admixtures. Mixing techniques depend on a variety of factors such as the specific types of polymers used, and the fillers, processing oils, waxes, and other ingredients used. In one or more embodiments, the ingredients can be added together in a single stage. In other embodiments, some of the ingredients such as EPDM, carbon black, etc. can be first loaded followed by the rubber. In other embodiments, a more conventional manner can be employed where the rubber is added first followed by the other ingredients. In even other embodiments, the rubber may be added at the same time as the EPDM.

Mixing cycles generally range from about 2 to 10 minutes. In certain embodiments an incremental procedure can be used whereby the rubber and part of the ingredients are added first, and the remaining ingredients are added in additional increments. In other embodiments, part of the rubber can be added on top of the other ingredients. In other embodiments, the rubber and EPDM are added together. In one or more embodiments, two-stage mixing can be employed. Where polychloroprene is employed as an ingredient in the rubber component of the compositions of this invention, a split masterbatch technique may be employed were the polychloroprene is separately compounded (e.g. during a first mixing stage) to form a masterbatch that is then combined with a masterbatch that may include the EPDM and/or the other complementary rubber. The masterbatch may include, for example, rubber, oil, and filler.

The EPDM can be added with the rubber near the beginning of the mixing cycle. (e.g., in the masterbatch) In one or more embodiments, the EPDM is added before the cure package is added. In other embodiments, it can be added with the cure package during final mix.

When utilizing an internal mixer, the dry or powdery materials such as the carbon black can be added first, followed by the processing aids and finally the rubber to form the masterbatch. The cure package (sulfur, accelerants, antidegradants, etc.) can be added near the end of the mixing cycle and at lower temperatures to prevent premature cross-linking of the rubber.

Once mixed, the rubber composition can be then formed into a sheet via calendaring or combined with a reinforcing cord-(fabric or metal). The compositions of the invention can also be formed into various types of articles using other techniques such as extrusion.

Airspring Manufacture

The vulcanizable rubber compositions of the present invention can be formed into airsleeves of air springs by employing conventional techniques for fabricating and manufacturing air springs. Air spring and air sleeve constructions and methods of their manufacture are known in the art as exemplified in U.S. Pat. Nos. 7,250,203, 5,527,170, and 6,439,550, which are incorporated herein by reference. In one or more embodiments, the various layers of the bellow are fabricated into a green bellow, which is an uncured bellow, and then subjected to curing conditions.

Advantageous Properties

In one or more embodiments, the vulcanizable rubber compositions of the present invention show improved heat resistance, while acceptable green strength and oil resistance properties are maintained. Flex properties at relatively high temperatures can be improved, as illustrated by resistance to crack propagation during a flex fatigue test. In certain embodiments, air springs formed from the inventive compositions are able to operate at service temperatures of about 115 to about 125° C. In particular embodiments, the bellows operate at a temperature in excess of 120° C. By employing the compositions of the present invention, good flex properties are maintained when the upper limit of the operating temperatures is increased from about 82 to about 93° C. to from about 115 to about 125° C.

Various modifications and alterations that do not depart from the scope and spirit of this invention will become apparent to those skilled in the art. This invention is not to be duly limited to the illustrative embodiments set forth herein.

What is claimed is:

1. A process for preparing an air bellow, the process comprising the steps of:
   providing a masterbatch (a) that includes:
      (ai) EPDM rubber,
      (aii) natural rubber, and
      (aiii) one or more ingredients selected from the group consisting of plasticizers, tackifiers, waxes, antioxidants, fillers, oils, and curatives;
   providing a masterbatch (b) that is prepared separately and independently from masterbatch (a) and that includes:
      (bi) a rubber including polychloroprene, a polychloroprene copolymer, or a mixture thereof,
      (bii) carbon black, and,
      (biii) one or more ingredients selected from the group consisting of plasticizers, tackifiers, antioxidants, fillers, and oils;
   combining the masterbatch (a), the masterbatch (b), and, optionally, one or more curatives, to form a vulcanizable composition, wherein the vulcanizable composition includes at least 20 parts by weight carbon black, per hundred parts rubber;

fabricating an uncured air bellow having four layers, including an innerliner layer, a first ply layer, a second ply layer, and an outer cover layer, where at least one layer is fabricated from the vulcanizable composition; and at least partially curing the uncured air bellow.

2. The process of claim 1, where the vulcanizable composition comprises at least 15 weight % EPDM, based upon the total weight of rubber.

3. The process of claim 1, where the EPDM includes at least 50 weight percent mer units deriving from ethylene, at least 0.5 weight percent mer units deriving from diene monomer, and the balance of the mer units deriving from propylene or other α-olefin.

4. The process of claim 1, where the EPDM has a Mooney Viscosity ($ML_{1+4}$@125° C.) of about 35 to about 70.

5. The process of claim 1, where the EPDM is characterized by having from 0 to about 13 weight percent crystallinity.

6. The process of claim 1, where the vulcanizable composition further comprises one or more rubbery polymers selected from the group consisting of synthetic polyisoprene, polybutadiene, polyisobutylene-co-isoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, nitrile rubber, silicone rubber, epichlorohydrin rubber, and mixtures thereof.

7. The process of claim 1, where the vulcanizable composition comprises from about 10 weight % to about 25 weight % polychloroprene or polychloroprene copolymer, based upon the total weight of rubber.

8. The process of claim 1, where the outer cover layer is fabricated from the vulcanizable composition.

9. The process of claim 1, where the vulcanizable composition includes from about 20 weight % to about 70 weight % rubber, based upon the total weight of the composition, the rubber consisting essentially of:
at least 15 weight % EPDM, based upon the total weight of rubber, natural rubber, and
at least one complementary rubber selected from the group consisting of polychloroprene, polychloroprene copolymers, nitrile rubber, poly(styrene-co-butadiene), and epichlorohydrin rubber, where the complementary rubber is present in an amount of from about 10 to about 25 weight %, based upon the total weight of rubber.

10. The process of claim 1, where the vulcanizable composition includes from about 20 weight % to about 70 weight % rubber, based upon the total weight of the composition, the rubber consisting essentially of:
from about 40 weight % to about 80 weight % EPDM, based upon the total weight of rubber,
natural rubber, and
at least one complementary rubber selected from the group consisting of polychloroprene, polychloroprene copolymers, nitrile rubber, poly(styrene-co-butadiene), and epichlorohydrin rubber.

* * * * *